(12) United States Patent  
Pettinaroli

(10) Patent No.: US 6,702,258 B1
(45) Date of Patent: Mar. 9, 2004

(54) UNIVERSAL BALL VALVE ASSEMBLY

(75) Inventor: Giulio Pettinaroli, S. Maurizio d'Opaglio (IT)

(73) Assignee: F. Pettinaroli, S.p.A., Novara (IT)

( * ) Notice: Subject to any disclaimer, the term of this patent is extended or adjusted under 35 U.S.C. 154(b) by 0 days.

(21) Appl. No.: 10/167,637

(22) Filed: Jun. 10, 2002

(51) Int. Cl.$^7$ ................................................ F16K 5/06
(52) U.S. Cl. .................. 251/315.01; 285/12; 285/382.7
(58) Field of Search ....................... 251/315.01; 285/12, 285/382.7

(56) References Cited

U.S. PATENT DOCUMENTS 3,834,742 A * 9/1974 McPhillips ............... 285/382.7
3,915,479 A * 10/1975 Sotolongo ................. 285/382.7
4,589,688 A * 5/1986 Johnson ...................... 285/12
5,074,599 A * 12/1991 Wirbel et al. ............. 285/382.7

* cited by examiner

Primary Examiner—John Bastianelli
(74) Attorney, Agent, or Firm—Charles W. Chandler

(57) ABSTRACT

A ball valve assembly having a single valve body having a female inlet opening which can be coupled to a selected one of a range of commercially available conduit sizes and materials. A series of adapter fittings are used, each corresponding to a different conduit size. The adapter ring is seated against the valve inlet opening. A compression ring mounted on the conduit is inserted in the valve opening to abut the adapter ring. A compression nut is mounted on the valve body to compress the compression ring to frictionally engage the conduit.

15 Claims, 4 Drawing Sheets

UNIVERSAL BALL VALVE ASSEMBLY

BACKGROUND AND SUMMARY OF THE INVENTION

Ball valves are adapted to be connected to conduits of a specific diameter or material. For example, if the conduit is brass, a certain type of fitting is used for connecting the conduit (pipe) to a valve adapted to take that type of fitting. If the conduit is polyethylene, than a valve having a different inlet opening and adapter is employed. A ¼" valve may have a 0.25 inlet opening. A ½" valve has a 0.50 inlet opening.

Consequently, a wide range of ball valves must be used to accommodate a range of pipe sizes.

The preferred embodiment of the present invention reduces the number of ball valves required on a project by using a single valve body structure having a female inlet opening that may be coupled to a range of commercially available conduit sizes and materials by using a series of adapter fittings. In its simplest form, each fitting comprises an adapter ring that is seated against the inlet opening of the ball valve. A compression ring is slidably mounted on the conduit which is then inserted in the valve opening such that the compression ring abuts the adapter ring.

The compression ring has a frusto-conical surface facing away from the valve body. A compression nut having a mating frusto-conical shoulder is then threadably mounted on the valve body in a process in which the frusto-conical shoulder on the compression ring squeezes the compression ring to reduce its internal diameter to frictionally engage the conduit, preventing separation of the conduit from the valve body. Different compression rings having different sized internal openings are utilized for different sized conduits. The adapter ring, in one form, is suited for engaging a brass valve, and in another form has an internal sleeve that is received inside a polyethylene pipe. A variety of compression rings may be used for connecting a variety of different diameter conduits to a single valve body.

Still further objects and advantages of the invention, will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
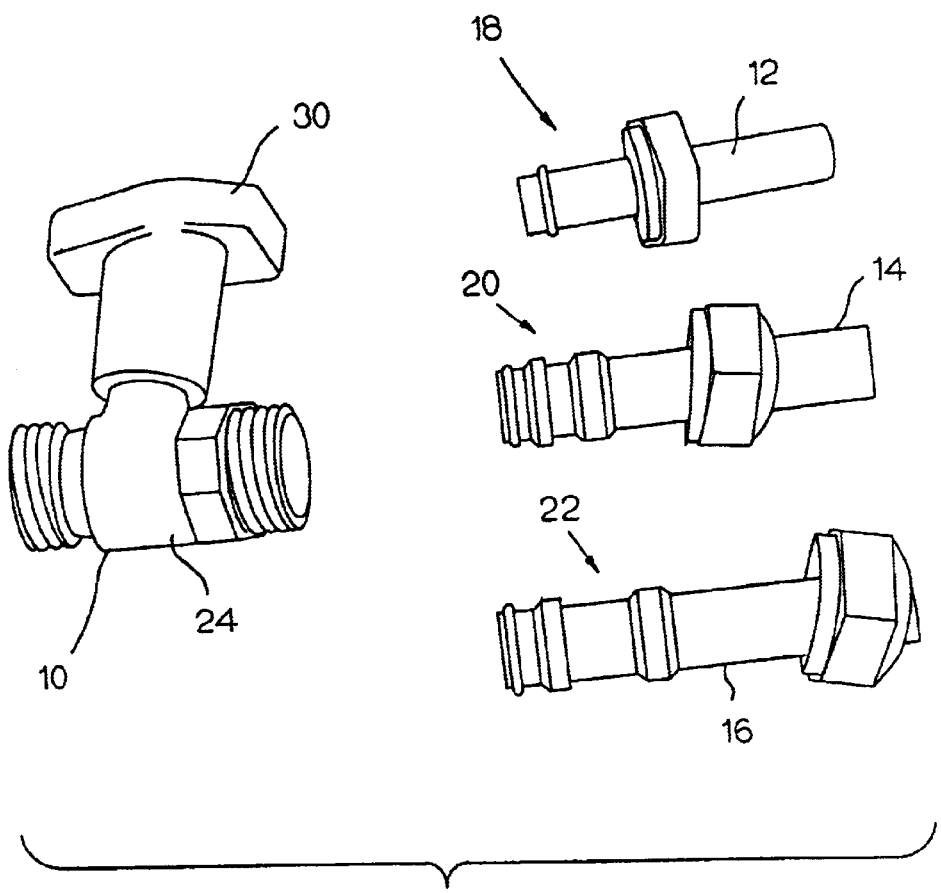
FIG. 1 illustrates a ball valve having an inlet opening for receiving at least three different conduits of different materials and diameters.

FIG. 1 illustrates a conventional ball valve 10 which may be connected to a brass conduit 12, a plastic conduit 14 or a plastic conduit 16 having a larger outer diameter than that of conduit 14. The conduits are connected to the ball valve assembly by compression fittings 18, 20 or 22. Compression fittings 20 and 22 are identical except for certain dimensions which accommodate different diameter plastic conduits.

Figure 2:
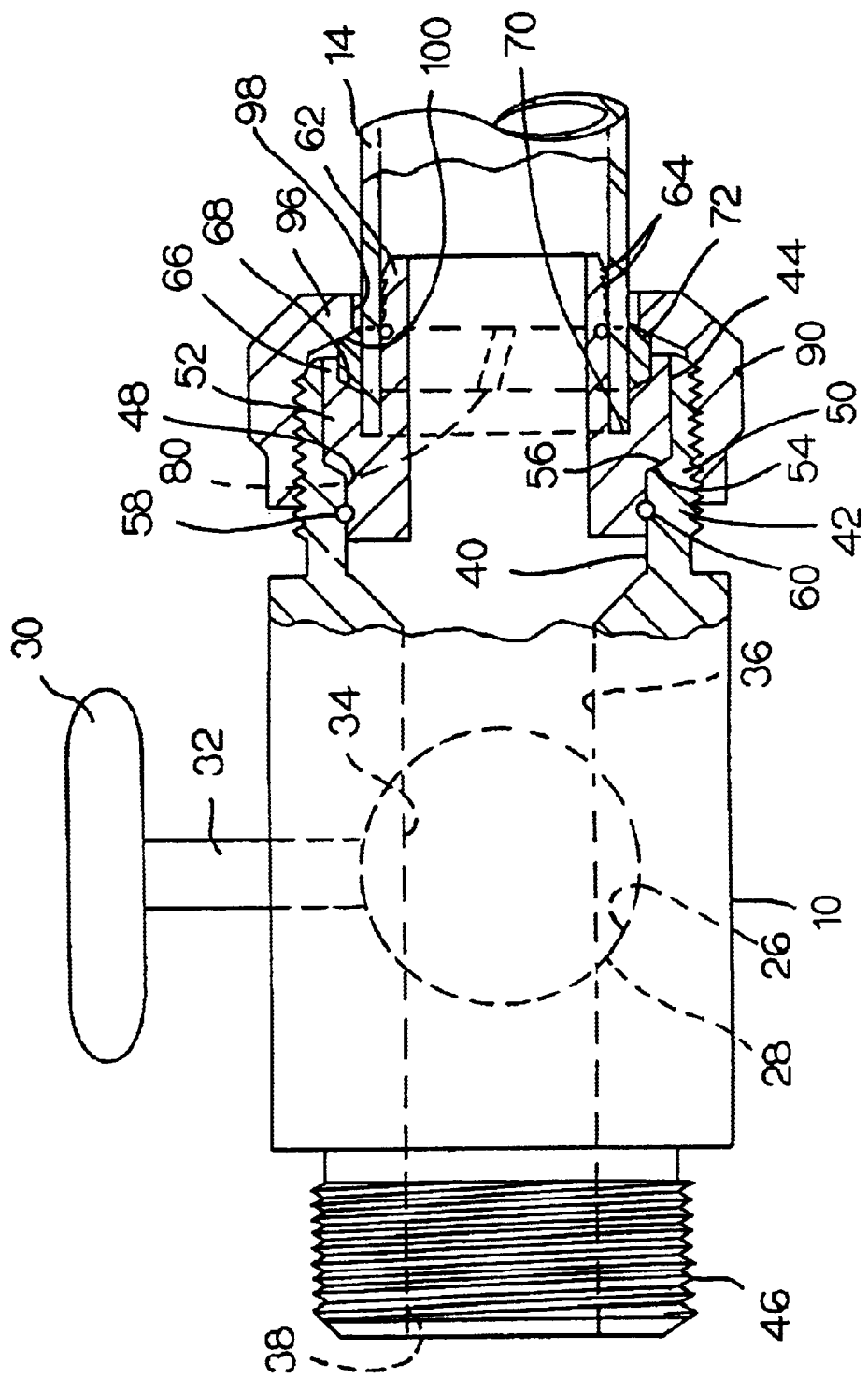
FIG. 2 is an enlarged sectional view of the ball valve illustrating a fitting assembly for connecting a plastic conduit.

Referring to FIG. 2, ball valve 10 comprises a body 24 having an internal valve chamber 26 for receiving a ball 28. A handle 30 is connected by a stem 32 to ball 28 to rotate it between positions in which valve internal passage 34 is aligned with a through passage 36 in the valve body. The through passage has an opening 38 at one end and a larger opening 40 at the other end.

The valve body has a tubular, externally threaded section 42 having an annular seat 44 defining one end of passage 36. The opposite end of the ball valve body has a similar threaded section 46. Tubular section 42 has a smooth internal passage 48.

An annular adapter member 50 has an annular shoulder 52 slidably received in passage 36. Adapter member 50 has a male frusto-conical surface 54 which mates with a female frusto-conical surface 56 in tubular section 42.

The ball valve is made of brass, and the adapter is also formed of a similar brass.

The adapter member has an annular groove 58 for receiving an O-ring seal 60 to form a fluid-tight connection between the adapter member and the valve body passage.

The outer end of the adapter member has a tubular end 62 which is slidably received in conduit 14. Tubular end 62 has a series of longitudinally spaced annular enlargements 64 which frictionally engage the inner surface of conduit 14 when it is pressed onto tubular end 62. The adapter member also has a collar 66 with an internal female frusto-conical surface 68, and an annular wall 70.

Figures 4, 5:
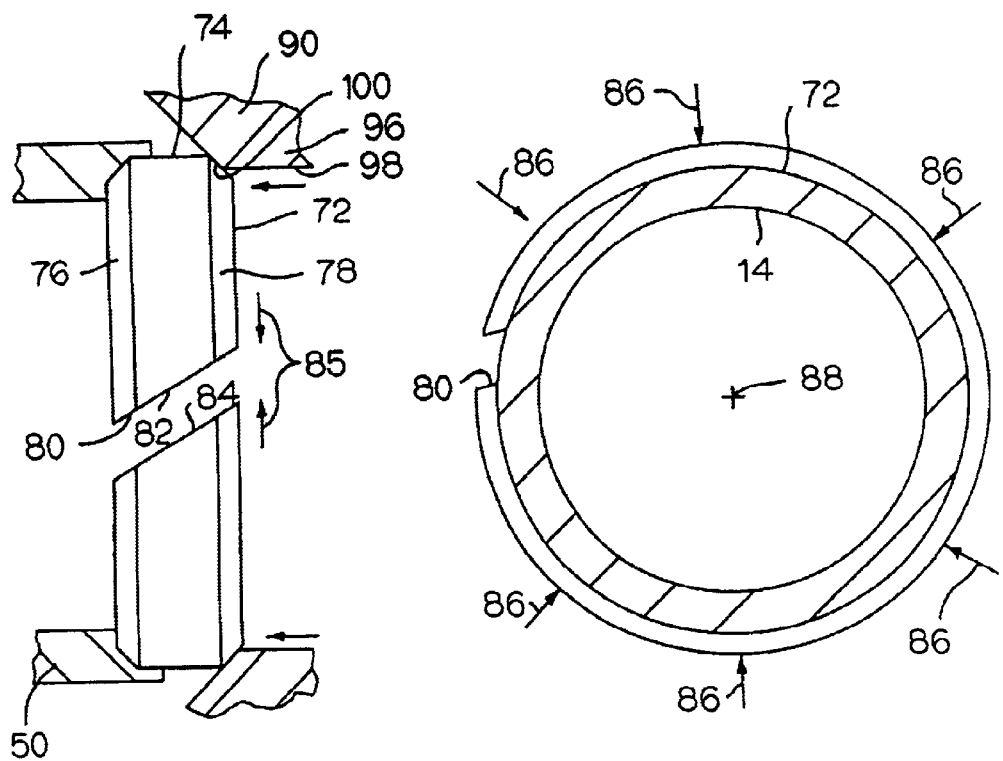
FIG. 4 is a view of the compression member.
FIG. 5 is another view of the compression member showing the manner in which the compression member is radially squeezed around the conduit.

A brass compression member 72, also shown in FIG. 4, is slidably mounted on conduit 14. The compression member has an inner diameter slightly larger than the outer diameter of conduit 14, and an outer diameter 74. One end of the compression member has a male frusto-conical surface 76 and the opposite end has a male frusto-conical surface 78. The compression member is annularly shaped except for a cutout portion 80 forming a pair of opposed ends 82 and 84. The compression member is radially compressed, as indicated by arrows 85 in FIG. 4, in which end 82 moves towards end 84 thereby reducing the inner diameter of the compression member. Such a force is applied in the direction of arrows 86 in FIG. 5, directed toward the radial center 88 of the tube and the compression member.

Figure 3:
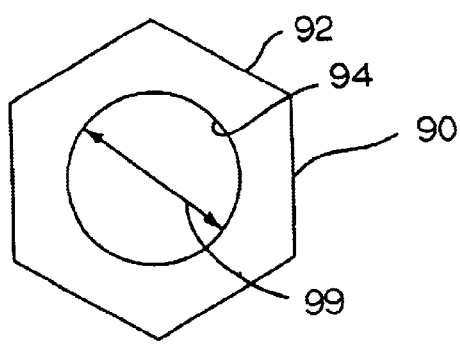
FIG. 3 is a view of the compression nut of the fitting of FIG. 2.

Brass compression nut 90 illustrated in FIGS. 2 and 3, has a hexagonal outer surface 92 for receiving a tool for turning the nut about its turning axis.

The compression nut has an internal threaded section 94 which threadably engages threaded section 42 of valve body 24. The compression nut has an internal shoulder 96 having an internal diameter 98 for slidably receiving conduit 14. The internal shoulder has a diameter 99 that is less than the larger diameter of the compression member. The shoulder has an internal female frusto-conical surface 100 which mates with male frusto-conical surface 78 of the compression member.

The arrangement is such that as the compression nut is turned about its turning axis onto the threads of the valve body, internal shoulder 96 biases or pushes the compression member toward the valve body until both frusto-conical ends of the compression members are engaged with mating female frusto-conical surfaces. Continued turning of the nut applies a camming radial force on the two frusto-conical surfaces 76 and 78 of the compression member thereby squeezing it toward a frictional engagement with conduit 14. The nut is tightened until the frictional connection is sufficient to prevent removal of the conduit from the valve body.

By substituting the compression member and the adapter member with other similar members having a different internal diameter, different sized conduits can be connected to the same ball valve.

Figure 6:
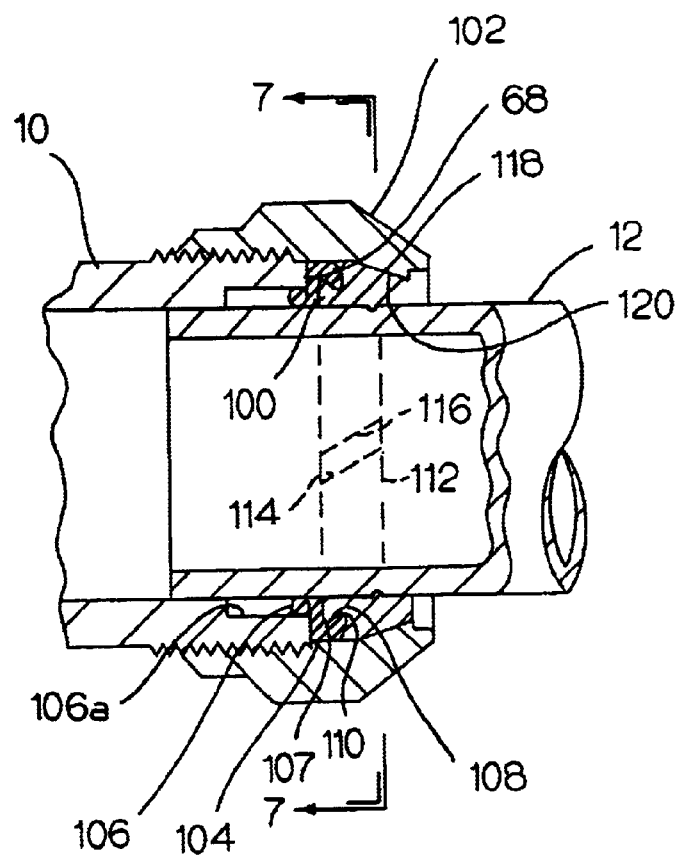
FIG. 6 is a view of another compression fitting for connecting a brass conduit to the ball valve.
Figure 7:
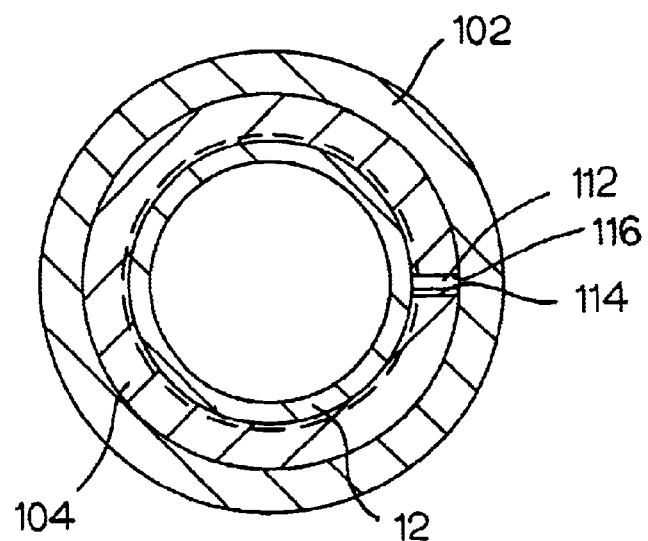
FIG. 7 is a sectional view generally as seen along lines 7—7 of FIG. 6.

Referring to FIGS. 6 and 7, brass conduit 12 may be connected to ball valve 10. In this case, conduit 12 is inserted through an internal opening 100 of a brass compression nut 102, through an adapter ring 104 and an annular sealing ring 106. The adapter ring seats against the outer end of opening 40 of the valve body with the sealing ring being compressed between the adapter ring and a frusto-conical end 106a of the valve body to form a fluid-tight seal.

Adapter ring 104 has a flat annular surface 107 seated against the valve body, and an internal groove 108 which receives a lip 110 of a compression ring 112. Compression ring 112 is radially expandable so that its inner edge snaps inside lip 110 of ring 104. Ring 112 has a pair of ends 114 and 116 that are similar to the ends of compression member 70. Compression ring 112 has a frusto-conical male surface 118 seated against an internal female frusto-conical surface 120 of nut 102 in such a manner that as the compression nut is tightened onto the valve body, frusto-conical surface 120 reduces the inner diameter of the compression ring so that it frictionally and tightly engages the outer surface of conduit 12. The nut is tightened until the conduit cannot be readily removed or separated from the valve body.

Other arrangements or configurations of the basic adapters can be employed for connecting a variety of different conduits to the same valve or to connect conduits of different diameters or materials to opposite ends of the valve body passage.

I claim:

1. A ball valve assembly, comprising:
    a valve body having an internal ball valve chamber therein;
    the valve body having an externally threaded section having an internal flow passage fluidly connected to the valve body chamber and having an annular valve body seat defining an opening for passing a fluid through said internal flow passage;
    a ball valve having a passage therein, said ball valve being disposed within said ball valve chamber and being rotatable to permit selective placement of the ball valve passage in or out of alignment with said internal flow passage;
    an annular adapter having a first annular seat in abutment with the valve body seat, the annular adapter having a second annular seat concentric with the first annular seat;
    an annular radially compressible compression member having a first annular end and a second annular end, the first annular end being disposed in abutment with the second annular seat of the annular adapter, and the second annular end having a frusto-conical surface about an internal opening for inserting the free end of a conduit therein;
    a compression nut having an internal opening for slidably receiving a conduit having a free end inserted in the compression member, and an internal shoulder disposed about said internal opening for slidably engaging the frusto-conical surface of the compression member, the compression nut having internal threads engageable with the external threaded section of the valve body such that as the compression nut is threaded on the valve body, the internal shoulder of the compression nut biases the compression member toward the annular adapter to reduce the diameter of the internal opening of the compression member to frictionally engage the conduit to prevent removal thereof from the compression member.

2. A ball valve assembly as defined in claim 1, including a second compression member having an internal opening with a diameter larger than that of the internal opening of the first mentioned compression member for receiving the free end of a second conduit;
    a second compression nut having an internal opening for slidably receiving a conduit having a free end inserted in the second compression member, and an internal shoulder disposed about said internal opening for slidably engaging the frusto-conical surface of the second compression member, the second compression nut having internal threads engageable with the external threaded section of the valve body such that as the second compression nut is threaded on the valve body, the internal shoulder of the second compression nut biases the second compression member toward the annular adapter to reduce the diameter of the internal opening of the second compression member to frictionally engage the conduit to prevent removal thereof from the second compression member.

3. A ball valve assembly as defined in claim 1, in which the annular adapter has an internal opening for passing therethrough the free end of a conduit inserted in the opening of the compression member.

4. A ball valve assembly as defined in claim 2, in which the second compression member has an internal opening for passing therethrough the free end of a conduit inserted through the second compression nut.

5. A ball valve assembly as defined in claim 1, in which the annular adapter has an internal sleeve slidably receivable in the end of a conduit inserted in the compression member.

6. A ball valve assembly as defined in claim 2, in which the annular adapter has an internal sleeve slidably receivable in the end of a conduit inserted in the second compression member.

7. A ball valve assembly as defined in claim 5, in which the annular adapter has a female frusto-conical surface for engaging the first annular end of the compression member to radially bias the compression member as the compression nut is threadably mounted on the valve body.

8. A ball valve assembly as defined in claim 1, in which the compression member comprises an annular ring having a pair of opposed spaced ends which are movable one toward the other as the compression nut biases the compression member toward the adapter member.

9. A ball valve assembly as defined in claim 2, in which the second compression member comprises an annular ring having a pair of opposed spaced ends which are movable one toward the other as the second compression nut biases the second compression member toward the adapter member.

10. A ball valve assembly as defined in claim 1, in which the compression member is adapted to frictionally engage a brass conduit.

11. A ball valve assembly as defined in claim 2, in which at least one of the compression members is adapted to frictionally engage a brass conduit to prevent separation of the brass conduit from the valve body.

12. A ball valve body assembly as defined in claim 2, in which at least one of the conduits is of a plastic material.

13. A ball valve body assembly as defined in claim 2, in which the valve body has two openings with similar internal diameters, one for being connected to a conduit of a first diameter and the second ending for being connected to a conduit of a second, larger diameter.

14. A combination fitting assembly for use with a ball valve body, having an internal ball valve chamber therein; the valve body having an externally threaded section having an internal flow passage fluidly connected to the valve body chamber and having an annular valve body seat defining an opening for passing a fluid through said internal flow passage; a ball valve having a passage therein, said ball valve being disposed within said ball valve chamber and being rotatable to permit selective placement of the ball valve passage in and out of alignment with said internal flow passage;

the fitting assembly comprising a first annular adapter having a first annular seat in abutment with the valve body seat, the annular adapter having a second annular seat concentric with the first annular seat;

an annular radially compressible first compression member having a first annular end and a second annular end, the first annular end being disposed in abutment with the second annular seat of the annular adapter, and the second annular end having a frusto-conical surface about an internal opening for inserting the free end of a conduit therein;

a first compression nut having an internal opening for slidably receiving a conduit having a free end inserted in the compression first member, and an internal shoulder disposed about said internal opening for slidably engaging the frusto-conical surface of the first compression member, the first compression nut having internal threads engageable with the external threaded section of the valve body such that as the first compression nut is threaded on the valve body, the internal shoulder of the first compression nut biases the first compression member toward the annular adapter to reduce the diameter of the internal opening of the first compression member to frictionally engage the conduit to prevent removal thereof from the first compression member;

a second compression member having an internal opening with a diameter larger than that of the internal opening of the first mentioned compression member for receiving the free end of a second conduit;

a second compression nut having an internal opening for slidably receiving a conduit having a free end inserted in the second compression member, and an internal shoulder disposed about said internal opening for slidably engaging the frusto-conical surface of the second compression member, the second compression nut having internal threads engageable with the external threaded section of the valve body such that as the second compression nut is threaded on the valve body, the internal shoulder of the second compression nut biases the second compression member toward the annular adapter to reduce the diameter of the internal opening of the second compression member to frictionally engage the conduit to prevent removal thereof from the second compression member.

15. A valve assembly, comprising:

a valve body having an internal valve chamber therein;

the valve body having an externally threaded section having an internal flow passage fluidly connected to the valve body chamber and having an annular valve body seat defining an opening for passing a fluid through said internal flow passage;

a valve member disposed within said valve chamber and being rotatable to permit or block fluid passage or through said internal flow passage;

an annular adapter having a first annular seat in abutment with the valve body seat, the annular adapter having a second annular seat concentric with the first annular seat;

an annular radially compressible compression member having a first annular end and a second annular end, the first annular end being disposed in abutment with the second annular seat of the annular adapter, and the second annular end having a frusto-conical surface about an internal opening for inserting the free end of a conduit therein;

a compression nut having an internal opening for slidably receiving a conduit having a free end inserted in the compression member, and an internal shoulder disposed about said internal opening for slidably engaging the frusto-conical surface of the compression member, the compression nut having internal threads engageable with the external threaded section of the valve body such that as the compression nut is threaded on the valve body, the internal shoulder of the compression nut biases the compression member toward the annular adapter to reduce the diameter of the internal opening of the compression member to frictionally engage the conduit to prevent removal thereof from the compression member.

* * * * *